Patented Dec. 8, 1931

1,835,767

UNITED STATES PATENT OFFICE

CARLETON ELLIS, OF MONTCLAIR, NEW JERSEY

COMPOSITION OF MATTER AND PLASTICS AND COATINGS THEREFROM

No Drawing.   Application filed June 18, 1925. Serial No. 38,085.

This invention relates to a composition of matter comprising sulphur and an agent which modifies its physical properties and relates especially to sulphur incorporated or blended with substances that are completely or largely soluble in sulphur, yielding solid solutions or masses, the properties of which are substantially different from those of ordinary sulphur.

As is well known sulphur has marked crystallizing tendencies and furthermore is not (e. g. when in the molten state) miscible with most substances. In some cases it forms what may be termed emulsions, but homogeneous products in which free sulphur is present in substantial proportion in a thoroughly blended state have not heretofore been satisfactorily obtained so far as I am advised. By the present invention which continues matter heretofore set forth in pending applications 607,909 filed Dec. 19, 1922; 609,133 filed Dec. 26, 1922; 12,360 filed July 28, 1925 and others, I blend with or dissolve in sulphur a sulphur-containing substance preferably one containing at least 10 per cent of combined sulphur and more advantageously 20 to 25 per cent of combined sulphur. Substances which are suitable for this purpose are sulphuretted or sulphurized resins such as those obtained by reacting on phenol, cresol, xylenol and the like with sulphur chloride. Resins may be made in this manner which contain from say 20 to 60 per cent of combined sulphur. The resins with low proportions of sulphur are softer than those made with the larger proportions. Phenol will react with a much larger proportion of sulphur chloride than is the case with the xylenols. The crude xylenols or tar acids, for example a mixture of tar acids boiling above 205° or 210° C. and containing a considerable proportion of xylenols will react with for example an equal weight of sulphur chloride to form a resin which blends readily with sulphur. The present case is for matter in part continued from the above mentioned cases.

The resin may be made by dissolving the xylenol in an equal volume of benzol and adding the sulphur chloride slowly with stirring, then removing the benzol by distillation or by blowing with air or steam and finally preferably passing a small amount of ammonia gas through the resin to neutralize any slight traces of acid. The latter is objectionable at times affecting the substances with which the composition subsequently may be incorporated. Hence I prefer to obtain and employ a neutral or neutralized resin.

This resin may be added to molten sulphur in various proportions, for example equal parts of sulphur and the resin may be used. A cheaper mixture and one which I find satisfactory for most purposes is composed of 3 parts of sulphur to 1 part of the resin. The method of mixing may be along any suitable lines but preferably I simply melt the sulphur and add the resin, stirring until solution is completed or until an apparently homogeneous mixture or blend results.

Ordinary sulphur is very easily ignited and gives off suffocating fumes. For many purposes this is undesirable and in the present invention in one form I employ a quantity of the sulphur resin sufficient to retard or inhibit the combustion of the sulphur, as I have found that this sulphur resin, despite the fact that it would be expected to be inflammable, has the property when mixed with sulphur of changing the combustion qualities of the latter completely.

One part of the resin added to nine parts of sulphur permits combusion when a Bunsen flame is applied to a fragment thereof. One part of the resin to three parts of sulphur greatly retards the combustion and one part of resin to two parts of sulphur practically renders the sulphur unignitable. At least it renders it so resistant to ignition that it no longer has the combustible properties attributed to sulphur. In one case a mixture of one part of the resin to approximately two parts of sulphur when a flame was applied gave off fumes and showed indications of combustion but on removal of the flame the ignition ceased. The effect is still more pronounced with a mixture of equal parts of sulphur and the sulphur resin. Any combustion caused by the impingement of the powerful flame of a Bunsen burner on a mass of the mixture (which one would expect to be readily combustible), dying out instantly on removal of the Bunsen flame. This remarkable property of the sulphuretted resins in overcoming the combustibility of a substance so characteristically combustible as sulphur permits the latter to enter a field of application to which it has heretofore been denied. Thus for example I propose to admix it with fillers such as asbestos and various other mineral powders or fibers employed in the plastic molding industry and in the rubber field to make flooring, siding for rooms, artificial shingles or roofing, and other products which can be produced only through the ability to employ a cheap binding agent.

On mixing one pound of the xylenol sulphur chloride resin with three pounds of sulphur and incorporating one pound of this binding agent with three pounds of asbestos fibre or a mixture of asbestos fibre with china clay, talc, powdered mica and the like, adding if desired a coloring matter such as paranitraniline red and up to say one per cent of a material such as finely powdered aluminum palmitate to overcome sticking to the molds there is obtained on hot pressing a molded article having a good surface finish and which when exposed to a flame does not readily ignite. While the flame directly impinges on the specimen slight indications of combustion of the sulphur as shown by blue flame will be noted but on removal of the source of ignition the combustion does not spread and the flame quickly dies out. Such comment applies to small articles and it is possible that with large masses capable of holding more heat the combustion would continue for a slightly longer time.

On the other hand using a crude sulphur mixture made in the same manner on applying a flame a specimen burned with a blue flame which did not die out when the source of ignition was removed but continued to burn indefinitely. Such combustibility of sulphur apparently obtains whether pure refined sulphur is used or whether crude sulphur containing various impurities, including traces of tar, petroleum oil and the like is employed.

I may employ as fillers wood flour, flock, or other organic fillers and these may be used if desired, along with mineral fillers. These organic fillers under normal conditions (i. e. unless fireproofed by some special treatment) are combustible, hence may be defined as being "normally combustible".

I propose to make molded articles of all descriptions employing such molding composition. In using various colors or pigments to give such molded articles the proper shade I find some difficulty when using mineral colors to obtain a good surface of proper depth and brilliancy. By the use of dyes which are soluble to some extent in the resin sulphur mixture such effective appearing surface may be obtained even with one or two per cent of the dyestuff whereas ten per cent or more of a mineral pigment such as mineral red yields only a rather poor surface. The presence of the sulphur resin aids in the solution of the dyestuffs, most of which are not soluble in sulphur alone. Insulation which heretofore has not been feasible to prepare with sulphur as the binder on account of its ease of ignition may now be prepared. Advertising signs, artificial lumber, box impregnation, wood induration, dynamite cartons, impregnation of paper or felt conduits, pipe coating and acid proofing material, represent some of the applications of the foregoing.

Compositions containing free lime or magnesia or alkalies are preferably not employed and fillers containing such substances preferably, although not necessarily, are avoided in order to eliminate the possiblity of the formation of soluble sulphides which would generate hydrogen sulphide. On the other hand the addition of slightly alkaline material or ant-acid material such as borates or carbonate of lime and the like may be desirable in some cases as an ant-acid.

Another effect promoted by the sulphur resin is that of decrystallization of the sulphur. Ordinary sulphur crystallizes readily and forms a rather unsatisfactory surface on that account. Much smoother and more glossy surfaces can be obtained by incorporating the miscible resin. By having present from 25 to 50 per cent of the resin the tendency of the sulphur to crystallize in any objectionable way is overcome.

This is important when the composition is used for impregnating and glazing paper, cardboard, pressboard and the like, and in making laminated products. Thus pressboard (which are fibrous materials, composed in large part, of cellulose) may be dipped in a mixture of three parts of sulphur and one part of the resin containing a red dyestuff soluble in the mixture. Sheets of the pressboard dipped in the molten mixture, withdrawn and quickly cooled, as for example by plunging into cold water, have a red glossy surface and are very strong and stiff. In some cases it is desirable to im pregnate with sulphur alone and afterwards to glaze with the resin alone or with mixtures of sulphur and the resin.

It is possible to use a major proportion of the resin but preferably I employ a minor proportion, usually between 20 and 50 per cent of the mixture of sulphur and resin. For cheapness and moderately good fire resistance I may use 25 per cent of resin to 75 per cent of sulphur but for a more effective mixture I prefer to use 35 per cent of resin to 65 per cent of sulphur. With the latter proportions a substantially flameproof product results while with a 25 per cent resin to 75 per cent sulphur composition although there is a marked combustion retarding tendency over normal sulphur the result is not as perfect as with a slightly higher percentage of the resin.

It is possible to also add other substances such as oils, tars, pitches, resins and the like, rubber and other substances which vulcanize with sulphur, even though these do not dissolve in sulphur provided such additions do not impair the composition for the purposes of the present invention. I do not wish my invention to be avoided by such extraneous additions many of which will now be apparent to those skilled in the art, in view of the foregoing disclosure, but in general I do not recommend these non-miscible substances except when used as fillers because of their tendency to weaken the bonding action of the sulphur or impair the gloss or create one disturbance or another.

The degree of combustibility or flameproof qualities of the sulphur therefore vary in proportion to the amount of sulphur resin added and the exact stage of flameproofedness required for any particular application may therefore be readily adjusted.

It is desirable to have the composition intended for molding in steel molds quite well dried before employment in this manner because moisture may result in staining the molds. The addition of ammonium phosphate or other fireproofing agents is not precluded. Also it is possible to add tricresylphosphate or other softening agents for some purposes.

While I have described the invention particularly with reference to the sulphur resins aforesaid I wish to embrace hereunder other substances such as specially sulphuretted oils and the like having the same or equivalent properties. I use the term "sulphur resin" to embrace such substances.

When using crude sulphur it is sometimes found that there will be particles of substances which are undesirable when glazing paper or for similar purposes and under such circumstances I may filter the molten sulphur resin mixture before use.

In making acid-proof vats or blocks and for impregnating Portland cement masses and the like I prefer to use a mixture of sulphur and sulphur resin containing a maximum amount of combined sulphur, e. g. phenol sulphur chloride resin made from one part of phenol by weight to three parts of sulphur chloride.

In the foregoing the proportions given are by weight.

In using the terms "slow burning" and "flameproof" in the specification and claims I do not wish to convey the impression that for example a molded article made from asbestos and sulphur and sulphur resin will not burn on the application of flame. The mass will darken and disintegrate giving off smoke when a Bunsen flame is applied but the vapors coming from the mass made under approved conditions do not ignite as would be expected and the flame or combustion does not propagate when the Bunsen flame has been removed from contact with the molded specimens. However the product is disintegrated by the heat and no longer retains its true molded shape nor its surface finish.

What I claim is:—

1. A composition of matter comprising a sulphur-containing resin uniformly incorporated with sulphur and also containing tricresyl phosphate.

2. A composition of matter comprising a sulphur-containing resin uniformly incorporated with sulphur and also containing an aryl phosphate as a softening agent.

3. A composition of matter comprising a normally combustible filler and as a bonding agent, free sulphur and a sulphur resin, such composition being adapted, on molding, to produce a relatively flame-resistant article.

4. A composition comprising sulphur, a resin soluble in molten sulphur and a dye soluble in the mixture when in a molten state.

5. A molded article comprising a normally combustible filler, and as a binder, a composition comprising sulphur and a sulphur resin soluble therein.

6. A composition of matter comprising a sulphur-containing resin uniformly incorporated with sulphur and also containing a softening agent.

CARLETON ELLIS.